United States Patent
Kim

(10) Patent No.: US 9,999,080 B2
(45) Date of Patent: *Jun. 12, 2018

(54) DEVICE AND METHOD FOR PERFORMING DEVICE-TO-DEVICE COMMUNICATION

(71) Applicant: LG ELECTRONICS INC., Seoul (KR)

(72) Inventor: Jungwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

This patent is subject to a terminal disclaimer.

(21) Appl. No.: 14/431,230

(22) PCT Filed: Oct. 14, 2013

(86) PCT No.: PCT/KR2013/009148
§ 371 (c)(1),
(2) Date: Mar. 25, 2015

(87) PCT Pub. No.: WO2014/058283
PCT Pub. Date: Apr. 17, 2014

(65) Prior Publication Data
US 2015/0282230 A1 Oct. 1, 2015

Related U.S. Application Data

(60) Provisional application No. 61/713,612, filed on Oct. 14, 2012.

(30) Foreign Application Priority Data

Oct. 14, 2013 (KR) ........................ 10-2013-0121874

(51) Int. Cl.
*H04W 76/02* (2009.01)
*H04W 84/20* (2009.01)
(Continued)

(52) U.S. Cl.
CPC .......... *H04W 76/023* (2013.01); *H04L 67/12* (2013.01); *H04W 4/008* (2013.01); *H04W 4/08* (2013.01);
(Continued)

(58) Field of Classification Search
CPC ..... H04W 84/20; H04W 84/12; H04W 92/18; H04W 4/08; H04W 4/005; H04W 76/023; H04W 4/008; H04W 8/005; H04L 67/12
See application file for complete search history.

(56) References Cited

U.S. PATENT DOCUMENTS

2011/0026504 A1   2/2011   Feinberg
2011/0082905 A1   4/2011   Wentink et al.
(Continued)

FOREIGN PATENT DOCUMENTS

KR   10-2011-0040025 A   4/2011
KR   10-2012-0028982 A   3/2012
(Continued)

*Primary Examiner* — Jianye Wu
(74) *Attorney, Agent, or Firm* — Birch, Stewart, Kolasch & Birch, LLP

(57) ABSTRACT

The method for performing device-to-device communication by a first device according to the present invention comprises: a step of searching a second device that supports device-to-device communication; a step of receiving, from the found second device, second network information including information on whether or not the second device may access the Internet; and a step of determining either the first device or the second device as a group owner based on a first network information including on whether or not the first device may access the Internet and the second network information on the second device. The first device determines the second device as a group owner when the first network information indicates that the first device may not access the Internet.

6 Claims, 7 Drawing Sheets

(51) Int. Cl.
*H04L 29/08* (2006.01)
*H04W 4/00* (2018.01)
*H04W 4/08* (2009.01)
*H04W 8/00* (2009.01)
*H04W 92/18* (2009.01)
*H04W 84/12* (2009.01)

(52) U.S. Cl.
CPC .......... *H04W 8/005* (2013.01); *H04W 84/20* (2013.01); *H04W 84/12* (2013.01); *H04W 92/18* (2013.01)

(56) References Cited

U.S. PATENT DOCUMENTS

| | | |
|---|---|---|
| 2011/0085529 A1 | 4/2011 | Choi et al. |
| 2011/0225305 A1 | 9/2011 | Vedantham et al. |
| 2012/0106375 A1 | 5/2012 | Woo |
| 2012/0265913 A1* | 10/2012 | Suumaki ............... H04W 4/008 710/303 |
| 2012/0320886 A1* | 12/2012 | Anders, Jr. ......... H04W 76/023 370/338 |
| 2013/0034023 A1* | 2/2013 | Jung ..................... H04L 67/104 370/255 |
| 2013/0040576 A1* | 2/2013 | Yoon ..................... H04W 8/005 455/41.2 |
| 2013/0148149 A1* | 6/2013 | Park ....................... G06F 3/1296 358/1.13 |
| 2014/0092885 A1* | 4/2014 | Venkatachalam ... H04W 76/023 370/338 |
| 2014/0094122 A1* | 4/2014 | Etemad ................. H04W 76/02 455/41.2 |

FOREIGN PATENT DOCUMENTS

| | | |
|---|---|---|
| KR | 10-2012-0046547 A | 5/2012 |
| KR | 10-2012-0073321 A | 7/2012 |

* cited by examiner

US 9,999,080 B2

DEVICE AND METHOD FOR PERFORMING DEVICE-TO-DEVICE COMMUNICATION

CROSS REFERENCE TO RELATED APPLICATIONS

This application is the National Phase of PCT/KR2013/009148 filed on Oct. 14, 2013, which claims priority under 35 U.S.C. 119(e) to U.S. Provisional Application No. 61/713,612 filed on Oct. 14, 2012 and under 35 U.S.C. 119(a) to Patent Application No. 10-2013-0121874 filed on Oct. 14, 2013 in Korea, Republic of, all of which are hereby expressly incorporated by reference into the present application.

TECHNICAL FIELD

The present invention relates to a device-to-device communication, and more particularly, to a device and method for performing a communication using Wi-Fi Direct.

BACKGROUND ART

A device-to-device communication may include Wi-Fi Direct, Bluetooth, Zigbee and the like. In this case, Wi-Fi a communication network as 'wireless LAN' for enjoying an ultrahigh speed internet nearby an access device (e.g., AP) installed spot. Wi-Fi Direct corresponds to a new version of an existing Wi-Fi and is a communication technology for connecting devices to each other through Wi-Fi by wireless without an internet network. The Wi-Fi Direct does not need a hotspot, a router, an access point (AP) and the like. If there are devices supportive of Wi-Fi Direct only, the devices are directly connected to each other to exchange files or share a communication network.

Thus, the Wi-Fi Direct is a sort of a direct communication between Wi-Fi loaded devices without an AP (access point) supportive of an inter Wi-Fi alliance device access.

A basic connection scheme of the Wi-Fi Direct is a scheme of one-to-one connecting two devices. For instance, one smartphone is connected to another smartphone by Wi-Fi Direct. A notebook and a mouse are connected to each other by Wi-Fi Direct. A tablet PC and a printer are connected to each other by Wi-Fi Direct. In this manner, a photo, a song, a video and the like loaded in one smartphone can be easily sent to another smartphone, a document and photo saved in a tablet PC can be printed in direct, contacts are synchronized between a PC and a smartphone, and game consoles are directly connected to each other to play games.

Several different devices can be connected to one device. For instance, a monitor, a printer, a digital camera and a mouse are collectively connected to a notebook supportive of Wi-Fi Direct. In doing so, if the notebook currently accesses an existing Wi-Fi network, other devices currently connected to the notebook can exactly access the Wi-Fi network for the Internet access. Yet, one-to-many system is provided as an option.

Meanwhile, when Wi-Fi Direct equipments perform an initial connection, they mutually determine an equipment to work as an AP. In accordance with this determination, a method of connecting devices in Wi-Fi Direct is described as follows. First of all, devices supportive of Wi-Fi Direct transceive control messages with each other to recognize that which device supports Wi-Fi Direct and then deliver informations required for a mutual access through the control messages. In doing so, a procedure for negotiating which one of two different Wi-Fi Direct devices will play a role as a group owner is included. In this case, the group owner means a device that plays a role as an AP by gaining a control over a connected device in a device group configuring a Wi-Fi Direct network. According to this negotiation procedure, a group owner role is determined in a manner that group owner intent values of two devices are exchanged.

However, according to a Wi-Fi Direct connection of the related art, since a group owner is determined in a manner of comparing preset group owner intent values corresponding to random values supposed to be sent in general, it is impossible to establish an efficient network connection (e.g., controlling a specific device to become a group owner, etc.).

DISCLOSURE OF THE INVENTION

Technical Task

To solve the above-described problem, one technical task of the present invention is to provide a method of performing a communication, by which a group owner can be determined in consideration of a network information in care of Wi-Fi Direct connection.

Another technical task of the present invention is to provide a method of performing a communication, by which a group owner intent value of a device can be dynamically changed to correspond to a group owner determined as appropriate for a specific network situation.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of performing a device-to-device communication in a $1^{st}$ device, including the steps of discovering a $2^{nd}$ device supportive of the device-to-device communication, receiving a $2^{nd}$ network information including an information on an ability or inability of Internet access of the $2^{nd}$ device from the discovered $2^{nd}$ device, and determining either the $1^{st}$ device or the $2^{nd}$ device as a group owner based on a $1^{st}$ network information including an information on an ability or inability of internet access of the $1^{st}$ device and the $2^{nd}$ network information of the $2^{nd}$ device, wherein if the $1^{st}$ network information indicates the inability of the internet access, the $1^{st}$ device determines the $2^{nd}$ device as the group owner.

In another aspect of the present invention, provided herein is a $1^{st}$ device in performing a device-to-device communication, including a receiver discovering a $2^{nd}$ device supportive of the device-to-device communication, the receiver receiving a $2^{nd}$ network information including an information on an ability or inability of internet access of the $2^{nd}$ device from the discovered $2^{nd}$ device and a processor determining either the $1^{st}$ device or the $2^{nd}$ device as a group owner based on a $1^{st}$ network information including an information on an ability or inability of internet access of the $1^{st}$ device and the $2^{nd}$ network information of the $2^{nd}$ device, wherein if the $1^{st}$ network information indicates the inability of the internet access, the $1^{st}$ device determines the $2^{nd}$ device as the group owner.

Advantageous Effects

A communication performing method according to the present invention can determine and set a group owner by comparing network information while maintaining an existing Wi-Fi Direct function.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Mode for Invention

In the following detailed description of the invention includes details to help the full understanding of the present invention. Yet, it is apparent to those skilled in the art that the present invention can be implemented without these details. For instance, although the following descriptions are made in detail on the assumption that a mobile communication system includes IEEE (institute of electrical and electronics engineers) 802.16 system or 3GPP ($3^{rd}$ generation partnership project) system, they are applicable to other random mobile communication systems except unique features of IEEE 802.16 system or 3GPP system.

Occasionally, to prevent the present invention from getting vaguer, structures and/or devices known to the public are skipped or can be represented as block diagrams centering on the core functions of the structures and/or devices.

Besides, in the following description, assume that a terminal device is a common name of such a mobile or fixed user stage device as a user equipment (UE), a mobile station (MS), an advanced mobile station (AMS), and the like.

Informations transmitted or received by a terminal device may include data and various control informations. And, various kinds of physical channels may exist in accordance with types and usages of the informations transmitted or received by the terminal device.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention.

The present invention relates to a terminal device supportive of a device-to-device communication. In this case, the device-to-device communication may include one of Wi-Fi Direct, Bluetooth, Zigbee, and the like. For clarity of the following description, a device-to-device communication shall be limited to Wi-Fi Direct.

Figure 1:
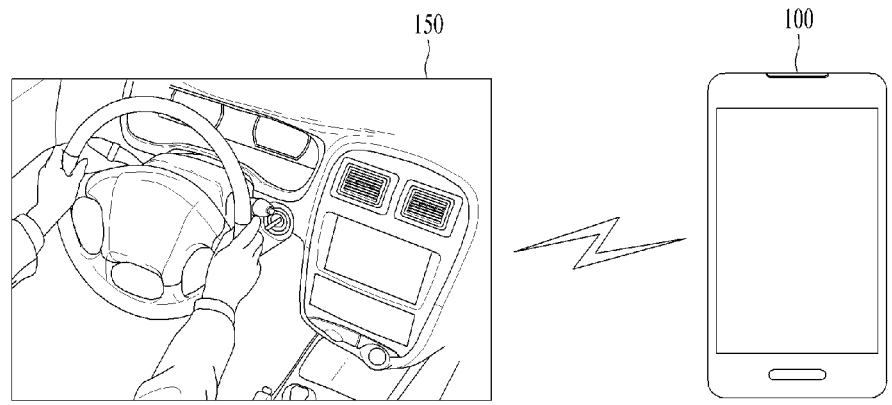
FIG. 1 is a diagram for a configuration of a Wi-Fi Direct network.

FIG. 1 is a diagram for a configuration of a Wi-Fi Direct network.

Wi-Fi is a wireless communication technology used widely and globally under the 802.11 Standard of IEEE and is used for various devices such as notebooks, mobile phones, game consoles, MP3, cameras, printers and the like. Wi-Fi is accepted as the representative technology of Wireless LAN (WLAN) for according Internet and corresponds to the technology for performing a communication centering on an access point (AP). Hence, Wi-Fi installed on various devices is configured to perform a communication only if the AP called a network access point is accessed.

Yet, Wi-Fi Alliance (WFA) has proposed the new standard 'Wi-Fi Direct' supportive of inter Wi-Fi P2P (peer to peer). Thus, the Wi-Fi Direct is a sort of a wireless communication technology capable of performing a direct communication between Wi-Fi loaded devices without an AP (access point) supportive of an inter Wi-Fi device access.

A basic connection scheme of the Wi-Fi Direct is a scheme of one-to-one connecting two devices. For instance, one smartphone is connected to another smartphone by Wi-Fi Direct. A notebook and a mouse are connected to each other by Wi-Fi Direct. A tablet PC and a printer are connected to each other by Wi-Fi Direct. In this manner, a photo, a song, a video and the like loaded in one smartphone can be easily sent to another smartphone, a document and photo saved in a tablet PC can be printed in direct, contacts are synchronized between a PC and a smartphone, and game consoles are directly connected to each other to play games.

Referring to FIG. 1, a mobile terminal device 100 and a vehicle head unit 1510 can communicate with each other using the Wi-Fi Direct technology. Thus, the Wi-Fi Direct technology connects the mobile terminal device 100 and the vehicle head unit 150 to each other, whereby the mobile terminal device 100 and the vehicle head unit 150 can share navigation, TV output, music play, social service, and vehicle information display with each other. As mentioned in the above description, the sharing function of the mobile terminal device 100 and the vehicle head unit 150 can be named a mirroring. Using a mirroring service, an application saved in the mobile terminal device 100 can be run in the vehicle head unit 150.

According to the description with reference to FIG. 1, a single mobile terminal device 100 and a single vehicle head unit 150 are connected to each other using Wi-Fi Direct. In some cases, a plurality of mobile terminal devices can be connected to a single vehicle head unit using Wi-Fi Direct, or a single mobile terminal device can be connected to a plurality of vehicle head units using Wi-Fi Direct.

According to another embodiment, a monitor, a printer, a digital camera and a mouse can be collectively connected to a notebook supportive of Wi-Fi Direct. In doing so, if the notebook currently accesses an existing Wi-Fi network, other devices currently connected to the notebook can access internet through the same Wi-Fi network. Yet, a one-to-many scheme is provided as an option.

Figure 2:
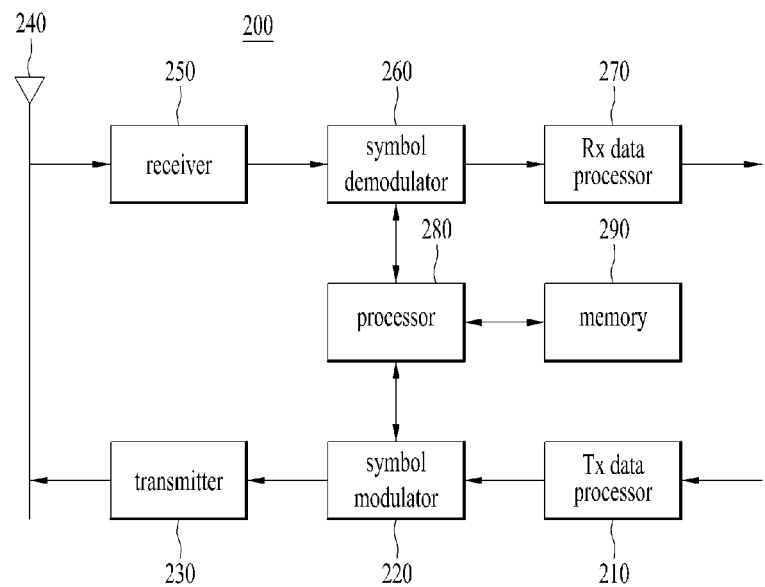
FIG. 2 is a block diagram for a configuration of a device configured to perform a communication using Wi-Fi Direct.

FIG. 2 is a block diagram for a configuration of a device configured to perform a communication using Wi-Fi Direct. Each of the mobile user equipment 100 and the vehicle head unit 150 supportive of Wi-Fi Direct shown in FIG. 1 can include the entire configuration of a device 200 described with reference to FIG. 2.

Referring to FIG. 2, a device 200 configured to perform a communication using Wi-Fi Direct may include a transmitted (Tx) data processor 210, a symbol modulator 220, a transmitter 230, a transceiving antenna 240, a receiver 250, a symbol demodulator 260, a received data processor 270, a processor 280 and a memory 290. Although a single transceiving antenna 240 is shown in the drawing, a plurality of transceiving antennas can be provided. Therefore, the device 200 according to the present invention supports an MIMO (multiple input multiple output) system. And, the device 200 according to the present invention can support both SU-MIMO (single user-MIMO) and MU-MIMO (multi user-MIMO) systems.

The transmitted data processor 210 receives traffic data, performs coding on the received traffic data by formatting, interleaves the coded traffic data, modulates (or symbol maps) the interleaved data, and then provides modulated symbols (i.e., data symbols). The symbol modulator 220 provides a stream of symbols by receiving and processing the data symbols and pilot symbols.

The symbol modulator 220 multiplexes the data and pilot symbols together and then transmits the multiplexed symbols to the transmitter 230. In doing so, each of the transmitted symbols may include the data symbol, the pilot symbol or a signal value of zero (i.e., null). In each symbol duration, pilot symbols may be contiguously transmitted. In doing so, the pilot symbols may include symbols of frequency division multiplexing (FDM), orthogonal frequency division multiplexing (OFDM), time division multiplexing (CDM), or code division multiplexing (CDM).

The transmitter 230 receives the stream of the symbols, converts the received stream to at least one or more analog signals, additionally adjusts the analog signals (e.g., amplification, filtering, frequency up-converting, etc.), and then generates a signal suitable for a transmission on a radio channel. If so, the generated signal is transmitted to another device via the transmitting antenna 240.

Meanwhile, the receiving antenna 240 receives a signal from another device and then provides the received signal to the receiver 250. Subsequently, the receiver 240 adjusts the received signal (e.g., filtering, amplification and frequency downconverting), digitizes the adjusted signal, and then obtains samples. The symbol demodulator 260 demodulates the received pilot symbols and then provides them to the processor 280 for channel estimation.

The symbol demodulator 260 receives a frequency response estimated value from the processor 280, obtains data symbol estimated values (i.e., estimated values of the transmitted data symbols) by performing data demodulation on the received data symbols, and then provides the data symbol estimated values to the received (Rx) data processor 270. The received data processor 270 reconstructs the transmitted traffic data by performing demodulation (i.e., symbol demapping, deinterleaving and decoding) on the data symbol estimated values.

The processing by the symbol demodulator 260 and the processing by the received data processor 270 are complementary to the processing by the symbol modulator 220 and the processing by the transmitted data processor 210, respectively.

The processor 280 directs operations (e.g., control, adjustment, management, etc.) in the device 200. The processor 280 may be connected to the memory 290 configured to store program codes and data. The memory 290 is connected to the processor 280 to store operating systems, applications and general files.

The processor 280 may be called one of a controller, a microcontroller, a microprocessor, a microcomputer and the like. And, the processor 280 may be implemented using hardware, firmware, software and/or any combinations thereof. In the implementation by hardware, one of ASICs (application specific integrated circuits), DSPs (digital signal processors), DSPDs (digital signal processing devices), PLDs (programmable logic devices), FPGAs (field programmable gate arrays) and the like, which are configured to embody the present invention, may be provided to the processor 280.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded on the processor 280 or saved in the memory 290 to be driven by the processor 280.

If necessary, the device 200 according to the present invention may further include various components as well as the components shown in FIG. 2. For instance, in case that the device 200 includes a mobile terminal device, it may further include components such as an A/V (audio/video) input unit configured to receive inputs of audio and video signals by including a camera, a microphone and the like, a user input unit configured to receive an input of a user's operation control by including a button, a touch sensor, a keypad and the like, a sensing unit configured to sense a current state such as a location of the mobile terminal device, bearings of the mobile terminal device, an acceleration of the mobile terminal device, a deceleration of the mobile terminal device, and an ability or inability of user contact with the mobile terminal device, an output unit configured to generate outputs related to a sight sense, an auditory sense, an haptic sense and the like by including a display, a speaker, a haptic motor and the like, an interface unit configured to connect to an external device by including an external charger port, an earphone port, a memory card port and the like, and a power supply unit configured to supply powers required for operations of the respective components by being supplied with an external power and an internal power under the control of a controller, and the like.

In the following description, an embodiment related to a wireless communication method, which can be embodied in the above-configured device shall be described with reference to the accompanying drawings.

For clarity of the following description, assume that a device configured to perform a device-to-device communication according to the present invention includes at least one of the components shown in FIG. 2. Moreover, in the following description, a $1^{st}$ device and a $2^{nd}$ device are the concepts to describe a device of a receiving side and a device of a transmitting side, respectively. And, assume that the $1^{st}$ device and the $2^{nd}$ device belong to the same network group.

In case that the present invention is implemented to provide a mirroring service for a vehicle, the $1^{st}$ device may include a mirroring server and the $2^{nd}$ device may include a mirroring client. In this case, the mirroring server may mean a mobile terminal device and the mirroring client may mean a vehicle head unit.

In particular, a $1^{st}$ device configured to perform a device-to-device communication according to the present invention searches the components shown in FIG. 2 for a $2^{nd}$ device supportive of the device-to-device communication and may include a receiver configured to receive a $2^{nd}$ network information including information on an ability or inability of internet access of the $2^{nd}$ device from the found $2^{nd}$ device and a processor determining one of the $1^{st}$ device and the $2^{nd}$ device as a group owner based on a $1^{st}$ network information including information on an ability or inability of internet access of the $1^{st}$ device and the $2^{nd}$ network information of the $2^{nd}$ device. In this case, if the $1^{st}$ network information indicates the inability of the internet access, the processor is characterized in determining the $2^{nd}$ device as the group owner.

Meanwhile, the receiver of the $1^{st}$ device according to one embodiment of the present invention is characterized in receiving a group owner intent value of the $2^{nd}$ device from the $2^{nd}$ device. In this case, in order to set the group owner intent value of the device determined as the group owner to have a greater value, the processor can set the group owner intent value of the $1^{st}$ device by comparing the group owner intent value of the $1^{st}$ device to the group owner intent value of the $2^{nd}$ device.

In some cases, the $1^{st}$ device may be designed to have a configuration that further includes a transmitter configured to transmit the set group owner intent value of the $1^{st}$ device to the $2^{nd}$ device.

Moreover, the $1^{st}$ device may further include a memory configured to store a group intent value of the $1^{st}$ device, the network information of the $1^{st}$ device, the network information received from the $2^{nd}$ device, and a group intent value of the $2^{nd}$ device.

Based on the above-mentioned assumptions, a method of determining a group owner of Wi-Fi Direct and a method of setting a group owner intent value are described in detail with reference to FIGS. 3 to 8 as follows.

Figure 3:
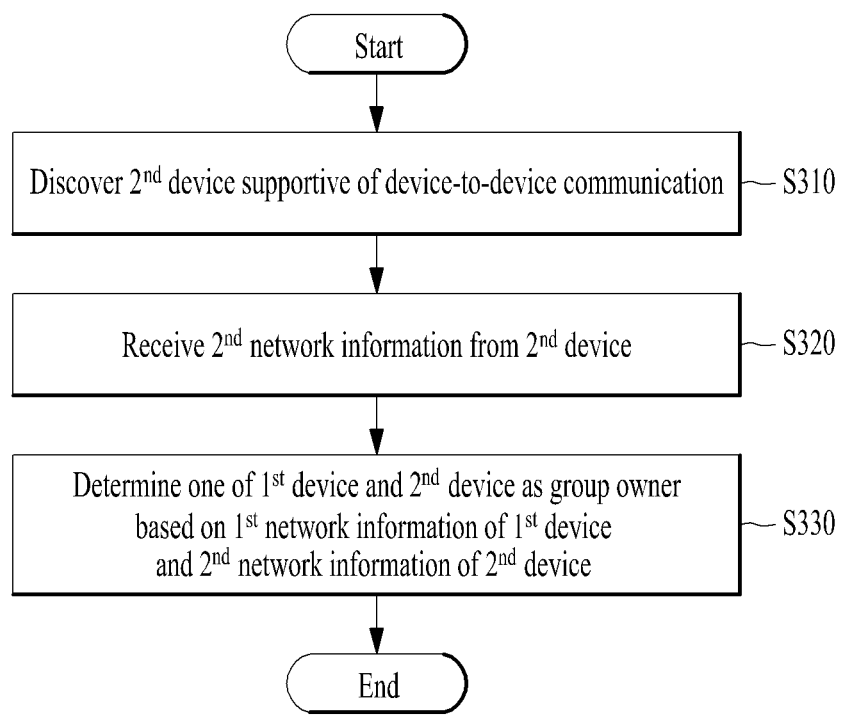
FIG. 3 is a flowchart to describe a method of determining a group owner of Wi-Fi Direct according to one embodiment of the present invention.

FIG. 3 is a flowchart to describe a method of determining a group owner of Wi-Fi Direct according to one embodiment of the present invention.

Referring to FIG. 3, a $1^{st}$ device according to one embodiment of the present invention searches for a $2^{nd}$ device supportive of Wi-Fi Direct [S310]. In particular, the $1^{st}$ device is able to discover the $2^{nd}$ device supportive of Wi-Fi Direct in a manner of detecting a beacon signal transmitted from the $2^{nd}$ device nearby and then performs a device discovery procedure.

Through the step S310, the $1^{st}$ device can receive a $2^{nd}$ network information from the found $2^{nd}$ device [S320]. In this case, the network information may include at least one of a type information indicating a server device or a client device, an information on an ability or inability of internet access, an information on a necessity of internet access, and an information on an ability or inability of support of communication with multiple devices. Table 1 shows one embodiment of network information of the present invention. The network information can be transmitted through the device discovery procedure.

Meanwhile, in the present specification, in order to distinguish a network information of the $1^{st}$ device from that of the $2^{nd}$ device, the network information of the $1^{st}$ device shall be described as a $1^{st}$ network information and the network information of the $2^{nd}$ device shall be described as a $2^{nd}$ network information. The $1^{st}$ network information and the $2^{nd}$ network information may correspond to the information of the same type.

TABLE 1

| Field | Description |
| --- | --- |
| Device Type | Information indicating a server device or a client device |
| Internet Access required | Information indicating whether an internet access is required |
| Internet Access available | Information indicating whether an internet access is available |
| Multiple ML Servers Support | Information indicating whether a client device supports an access of at least one server device |
| Supported Network Types | Information indicating a supportable network type (ex. GSM, GPRS, EDGE, UMTS, HSDPA, HSUPA, EV-DO, 1xRTT, LTE) |

Meanwhile, the $1^{st}$ device may be able to receive a service information from the found $2^{nd}$ device. In this case, the service information is an attribute information of a device required for a Wi-Fi Direct connection and may include P2P attribute ID Definitions defined in Wi-Fi Direct like Table 2 in the following.

TABLE 2

| Attribute ID | Note |
| --- | --- |
| 0 | Status |
| 1 | Minor Reason Code |
| 2 | P2P Capability |
| 3 | P2P Device ID |
| 4 | Group Owner Intent |
| 5 | Configuration Timeout |
| 6 | Listen Channel |
| 7 | P2P Group BSSID |
| 8 | Extended Listen Timing |
| 9 | Intended P2P Interface Address |
| 10 | P2P Manageability |
| 11 | Channel List |
| 12 | Notice of Absence |
| 13 | P2P Device Info |
| 14 | P2P Group Info |
| 15 | P2P Group ID |
| 16 | P2P Interface |
| 17 | Operating Channel |
| 18 | Invitation Flags |
| 19-220 | Reserved |
| 221 | Vendor Specific Attribute |
| 222-255 | Reserved |

Meanwhile, having received the service information, the $1^{st}$ device is able to determine whether it is a car connectivity service based Wi-Fi Direct connection based on the service information. As a result of the determination, only if it is the car connectivity service based Wi-Fi Direct connection, the $1^{st}$ device can go to a next step S330. Otherwise, the $1^{st}$ device can go to a group owner negotiation step according to a general Wi-Fi Direct connection. Such a determination can be made using a car connectivity service information that can be defined in one of Reserved field shown in Table 2. Yet, since the step of determining whether it is the car connectivity service based Wi-Fi Direct connection is an optional step, the $1^{st}$ device can go to the step S330 without making the determination. Meanwhile, the car connectivity service information definable in one of the Reserved field shown in Table 2 is shown in Table 3.

TABLE 3

| Field | Size (octets) | Value | Description |
|---|---|---|---|
| Attribute ID | 1 | 19-220, 222-255 | Identifying the type of P2P attribute |
| Length | 5 | | Length of the following fields in the attribute |
| MirrorLink Major Version | 1 | Variable | Information about the major version of MirrorLink the device supports |
| MirrorLink Minor Version | 1 | Variable | Information about the minor version of MirrorLink the device supports |
| MirrorLink Subminor Version | 1 | Variable | Information about the sub-minor version of MirrorLink the device supports |
| GO request | 1 | Variable | Information that is used to decide if P2P Device received this attribute information needs to re-configure its GO Intent value. |

The network information shown in Table 1 and the service information shown in Table 2 and Table 3 can be obtained from a device discovery frame or a GO (group owner) negotiation frame. The device discovery frame is transceived in a device discovery procedure, while the GO (group owner) negotiation frame is transceived in a GO formation procedure. The device discovery frame and the GO negotiation frame shall be described with reference to FIG. 7 and FIG. 8 later. In the present specification, the network information shown in Table 1 is described as information separate from the service information shown in Table 2 and Table 3. Yet, the network information can configure one information together with the service information.

After the step S320, the $1^{st}$ device is able to determine one of the $1^{st}$ device and the $2^{nd}$ device as a group owner by comparing the received $2^{nd}$ network information of the $2^{nd}$ device to the $1^{st}$ network information of the $1^{st}$ device [S330].

A detailed method of determining a group owner is described with reference to FIG. 4 as follows.

Figure 4:
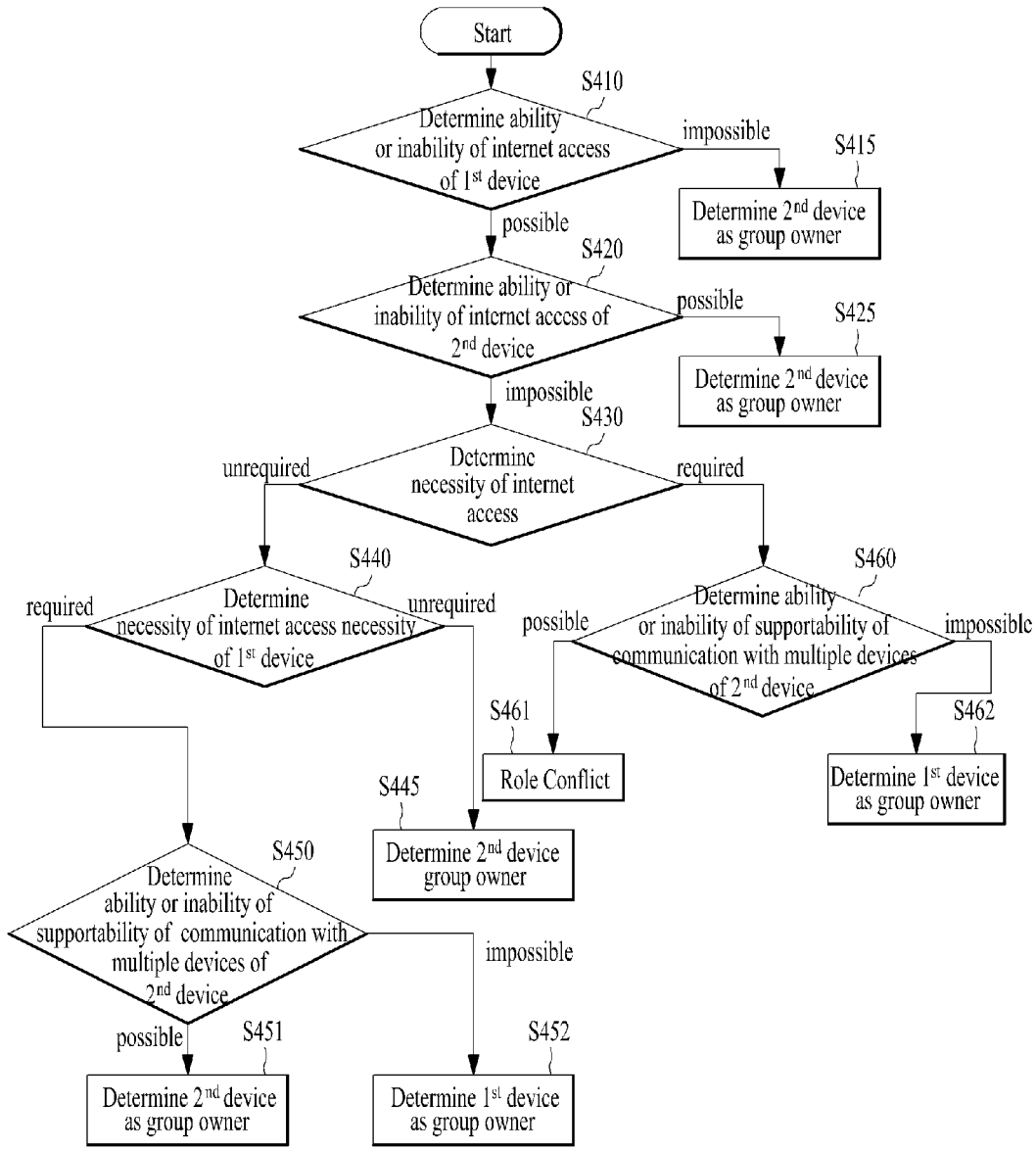
FIG. 4 is a flowchart to describe a detailed method of determining a group owner of Wi-Fi Direct according to one embodiment of the present invention.

FIG. 4 is a flowchart to describe a detailed method of determining a group owner of Wi-Fi Direct according to one embodiment of the present invention. In particular, FIG. 4 is a detailed flowchart of the step S330 shown in FIG. 3 and the step S310 and the step S320 shown in Table 3 are assumed as performed.

Referring to FIG. 4, the $1^{st}$ device can determine an ability or inability of internet access of the $1^{st}$ device based on the $1^{st}$ network information [S410]. If the $1^{st}$ network information indicates the inability of the internet access [S410, impossible], the $1^{st}$ device can determine the $2^{nd}$ device as a group owner [S415].

On the contrary, if the $1^{st}$ network information indicates the ability of the internet access [S410, possible], the $1^{st}$ device can determine an ability or inability of internet access of the $2^{nd}$ device based on the $2^{nd}$ network information [S420]. If the $2^{nd}$ network information indicates the ability of the internet access [S420, possible], the $1^{st}$ device can determine the $2^{nd}$ device as a group owner [S425].

On the contrary, if the $2^{nd}$ network information indicates the inability of the internet access [S420, impossible], the $1^{st}$ device can determine a necessity of internet access of the $2^{nd}$ device based on the $2^{nd}$ network information [S430]. If the $2^{nd}$ network information indicates the internet access is not necessary [S430, unrequired], the $1^{st}$ device further determines a necessity of internet access of the $1^{st}$ device based on the $1^{st}$ network information [S440]. If the $1^{st}$ network information indicates the internet access is not necessary [S440, unrequired], the $1^{st}$ device can determine the $2^{nd}$ device as a group owner.

On the contrary, if the $1^{st}$ network information indicates the necessity of the internet access [S440, required], the $1^{st}$ device determines whether it is possible for the $2^{nd}$ device to support communication with multiple devices based on the $2^{nd}$ network information [S450]. If the $2^{nd}$ network information indicates that it is possible for the $2^{nd}$ device to support communication with multiple devices [S450, possible], the $1^{st}$ device can determine the $2^{nd}$ device as a group owner [S451]. If the $2^{nd}$ network information indicates that it is impossible for the $2^{nd}$ device to support communication with multiple devices [S450, impossible], the $1^{st}$ device can determine itself as a group owner [S452]. In the step S452, the $1^{st}$ device is a group client and is able to use internet using an internet access function of its own.

On the other hand, if the $2^{nd}$ network information indicates the internet access is necessary [S430, required], the $1^{st}$ device can determine whether it is possible for the $2^{nd}$ device to support communication with multiple devices based on the $2^{nd}$ network information [S460]. If the $2^{nd}$ network information indicates that it is impossible for the $2^{nd}$ device to support communication with multiple devices [S460, impossible], the $1^{st}$ device can determine itself as a group owner [S462]. Otherwise, if the $2^{nd}$ network information indicates that it is possible for the $2^{nd}$ device to support communication with multiple devices [S460, possible], the $1^{st}$ device can determine a group owner role according to a separate reference.

The above-mentioned determining step S461 is called a role conflict and is able to determine a group owner using a device setting information of the $2^{nd}$ device (or a mirroring server). If the $2^{nd}$ device (or the mirroring server) prioritizes the internet access, the $1^{st}$ device (or a mirroring client) can be determined as a group owner. On the other hand, if the $2^{nd}$ device prioritizes the connection to the multiple devices, the $2^{nd}$ device can be determined as a group owner. In this case, the device setting information of the $2^{nd}$ device may be sent to the $1^{st}$ device in a manner of being contained in the network information or the service information.

In the following, Table 4 shows a reference for the group owner determining method shown in FIG. 4. The $1^{st}$ device can use Table 4 in determining a group owner. Table 4 can be saved in the memory of the $1^{st}$ device.

TABLE 4

| Internet access | | Internet access necessity | | Supportability of communication with multiple devices | Internet access selected device | Group owner determination result | |
|---|---|---|---|---|---|---|---|
| $1^{st}$ device | $2^{nd}$ device | $1^{st}$ device | $2^{nd}$ device | | | $1^{st}$ device | $2^{nd}$ device |
| Yes | Yes | Yes | Yes | | $2^{nd}$ device | Group | Group |
| | | Yes | No | | $2^{nd}$ device | client | owner |

TABLE 4-continued

| Internet access | | Internet access necessity | | Supportability of communication with multiple devices | Internet access selected device | Group owner determination result | |
|---|---|---|---|---|---|---|---|
| 1st device | 2nd device | 1st device | 2nd device | | | 1st device | 2nd device |
| | | No | Yes | | 2nd device | | |
| | | No | No | | N/A | | |
| Yes | No | Yes | Yes | Yes | conflict | conflict | conflict |
| | | | | No | 1st device | Group owner | Group client |
| | | Yes | No | Yes | 1st device | Group client | Group owner |
| | | | | No | 1st device | Group owner | Group client |
| | | No | Yes | Yes | Conflict | Conflict | Conflict |
| | | | | No | 1st device | Group owner | Group client |
| | | No | No | Yes | N/A | Group client | Group owner |
| | | | | No | N/A | Group client | Group owner |
| No | Yes | Yes | Yes | | 2nd device | Group client | Group owner |
| | | Yes | No | | 2nd device | | |
| | | No | Yes | | 2nd device | | |
| | | No | No | | N/A | | |
| No | No | Yes | Yes | | N/A | | |
| | | Yes | No | | N/A | | |
| | | No | Yes | | N/A | | |
| | | No | No | | N/A | | |

In the following description, a method of setting a group owner intent value is described with reference to FIG. 5. In particular, FIG. 5 shows an operation performed after the step S330 shown in FIG. 3 and assumes that the steps S300 to S330 have been performed.

Figure 5:
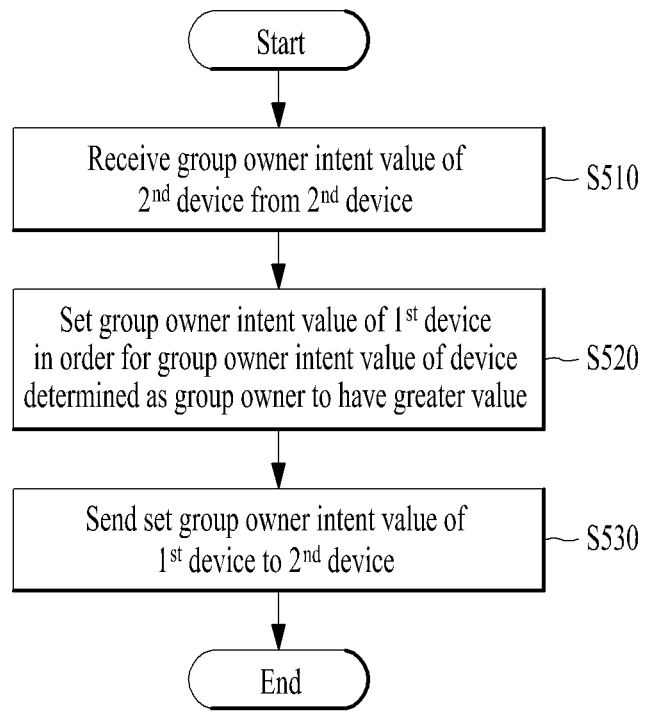
FIG. 5 is a flowchart to describe a method of setting a group owner intent value according to one embodiment of the present invention.

Referring to FIG. 5, the 1st device can receive a message containing a group owner intent value of the 2nd device from the 2nd device [S510]. In particular, the 1st device can receive a GO negotiation request message from the 2nd device. The GO negotiation request message can further contain the service information shown in Table 2 and Table 3 as well as the group owner intent value. In this case, the group owner intent value is the value used to determine a group owner. In Wi-Fi Direct, it is defined that the group owner intent value can be set to a value ranging from a minimum 0 to a maximum 15.

Subsequently, in order for the group owner intent value of a device determined as a group owner to have a greater value, the 1st device can set the group owner intent value of the 1st device by comparing the group owner intent value of the 1st device to the group owner intent value of the 2nd device [S520]. By comparing the group owner intent values of devices connected by Wi-Fi Direct, a device having a greater value can be set as a group owner. Hence, the 1st device can adjust the group owner intent value of the 1st device to correspond to the group owner and client determined in the step S330. Yet, in case that the group owner intent value corresponds in accordance with the group owner determined in the step S330, the 1st device may use the group owner intent value intact without adjusting the group owner intent value of the 1st device. For instance, if the 1st device is determined as the group owner and the group owner intent values of the 1st device and the 2nd device are 10 and 11, respectively, the 1st device can adjust the group owner intent value '10' of the 1st device into a value ranging between 12 and 15 in order for the group owner intent value of the 1st device to have a value greater than the group owner intent value '11' of the 2nd device. On the contrary, if the 1st device is determined as the group client and the group owner intent values of the 1st device and the 2nd device are 10 and 9, respectively, the 1st device can adjust the group owner intent value '10' of the 1st device into a value ranging between 0 and 9 in order for the group owner intent value of the 1st device to have a value smaller than the group owner intent value '9' of the 2nd device. On the other hand, if the 1st device is determined as the group owner and the group owner intent values of the 1st device and the 2nd device are 10 and 9, respectively, since the group owner intent value of the 1st device is greater than the group owner intent value of the 2nd device, the group owner intent value can be used as it is without separate adjustment. This method of setting the group owner intent value of the 1st device shall be described in detail with reference to FIG. 6 later.

Subsequently, the 1st device can send a message containing the set group owner intent value of the 1st device to the 2nd device [S530]. In particular, the 1st device can send the GO negotiation response message containing the group owner intent value of the 1st device set in the step S420 to the 2nd device.

Figure 6:
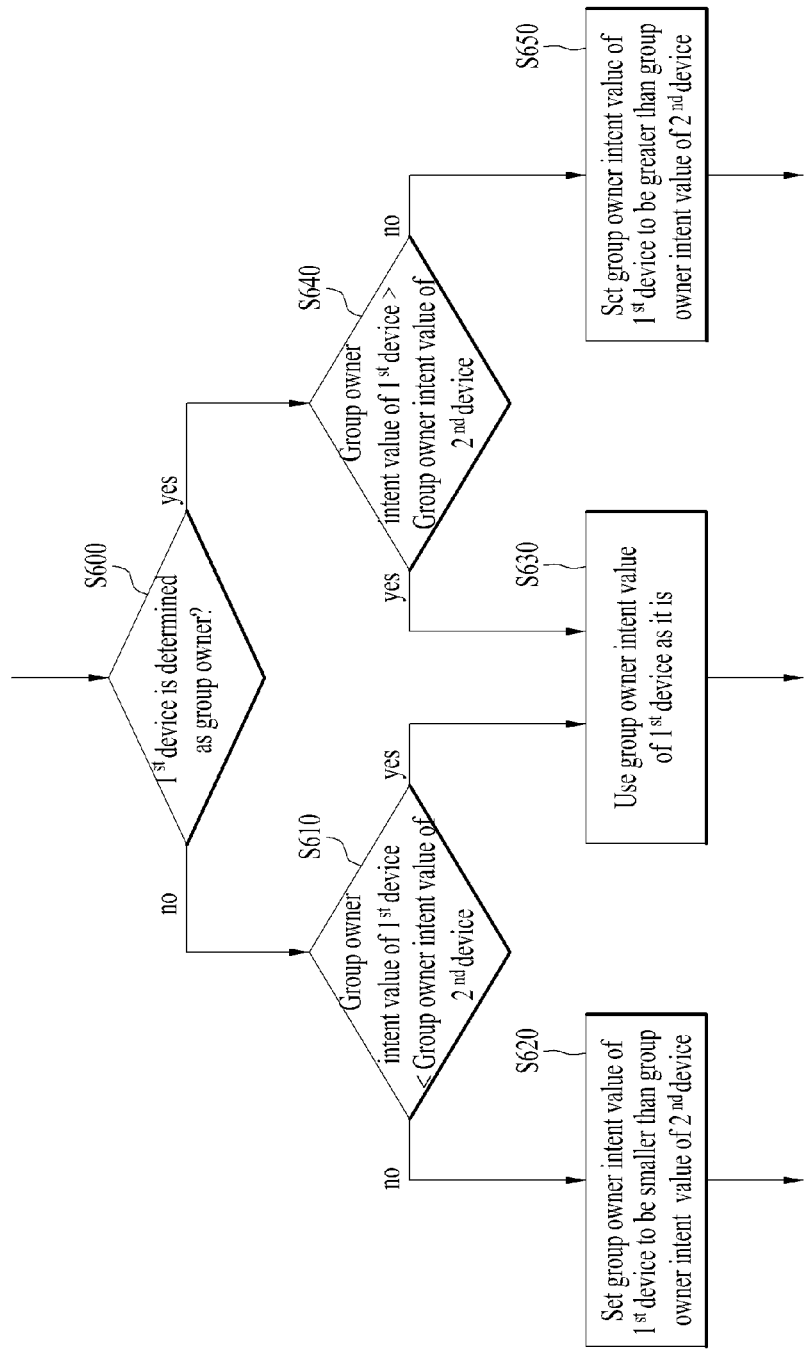
FIG. 6 is a flowchart to describe a detailed method of setting a group owner intent value according to one embodiment of the present invention.

In the following description, a method of setting a group owner intent value is described in detail with reference to FIG. 6. FIG. 6 is a detailed flowchart of the step S520 shown in FIG. 5 and assumes that the step S510 has been performed.

Referring to FIG. 6, the 1st device checks whether the 1st device is determined as the group owner. If the 1st device is determined as the group client [S600, No], the 1st device can compare the group owner intent value of the 1st device to the group owner intent value of the 2nd device. As a result of the comparison, if the group owner intent value of the 1st device is greater than the group owner intent value of the 2nd device [S610, No], the group owner intent value of the 1st device can be set smaller than the group owner intent value of the 2nd device [S620]. On the other hand, as a result of the comparison, if the group owner intent value of the 1st device is smaller than the group owner intent value of the 2nd device

[S610, Yes], the group owner intent value of the 1st device can be used as it is without adjustment [S630].

Meanwhile, the 1st device checks whether the 1st device is determined as the group owner. If the 1st device is determined as the group owner [S600, Yes], the 1st device can compare the group owner intent value of the 1st device to the group owner intent value of the 2nd device. As a result of the comparison, if the group owner intent value of the 1st device is smaller than the group owner intent value of the 2nd device [S640, No], the group owner intent value of the 1st device can be set greater than the group owner intent value of the 2nd device [S650]. On the other hand, as a result of the comparison, if the group owner intent value of the 1st device is greater than the group owner intent value of the 2nd device [S640, Yes], the group owner intent value of the 1st device can be used as it is without adjustment [S630].

According to the description with reference to FIG. 6, the group owner intent value of the 1st device is set. Yet, the group owner intent value of the device determined as the group owner can be set greater than the group owner intent value of the 2nd device. In this case, the group owner intent value of the 2nd device can be sent to the 2nd device in a manner of being contained in the GO negotiation response message. Thus, by adjusting not the group owner intent value of the 1st device but the group owner intent value of the rd device, the group owner intent value of the device determined as the group owner can be set to have a greater value. Hence, if the adjustment of the group owner intent value of the 1st device is required [S610, No, or S640, No], the 1st device displays the group owner intent values so that a user can select and adjust one of the group owner intent value of the 1st device and the group owner intent value of the 2nd device. Subsequently, the 1st device can receive a selection of the corresponding group owner intent value.

Therefore, since the group owner intent value can be dynamically set by the communication performing method mentioned in the above description, it is able to determine a group owner appropriate for a specific situation.

A communication performing procedure using Wi-Fi Direct according to one embodiment of the present invention is described in detail with reference to FIG. 7 and FIG. 8 as follows.

Figure 7:
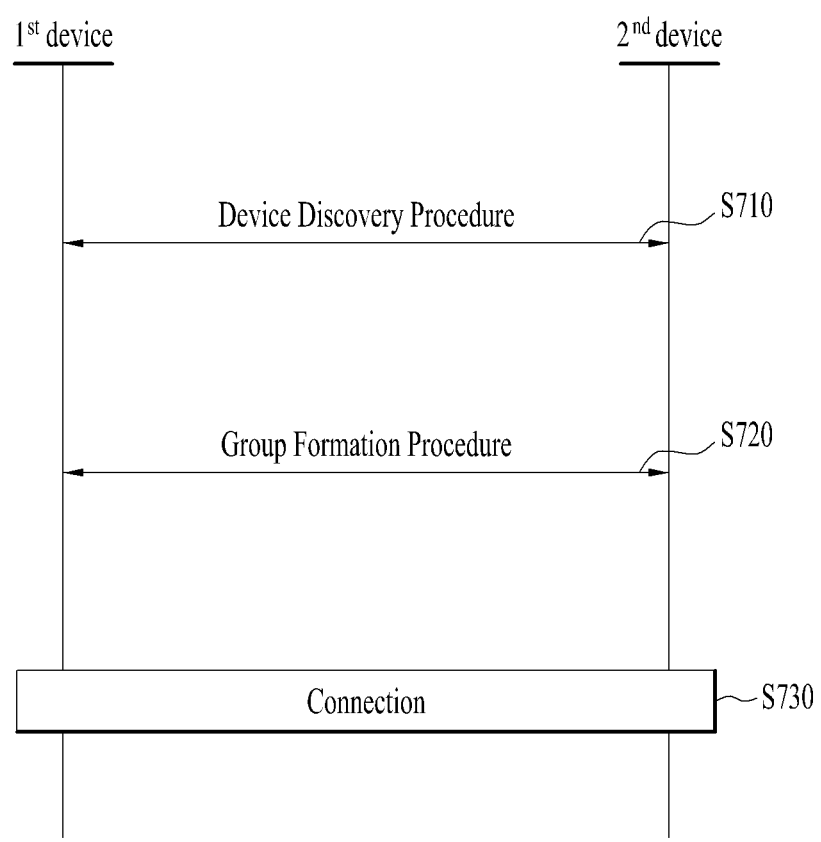
FIG. 7 is a schematic diagram of a communication performing procedure using Wi-Fi Direct according to one embodiment of the present invention.

FIG. 7 is a schematic diagram of a communication performing procedure using Wi-Fi Direct according to one embodiment of the present invention.

Referring to FIG. 7, a 1st device and a 2nd device, which can support Wi-Fi Direct, can be connected to each other [S730] by performing a device discovery procedure [S710] and a group formation procedure [S720].

The device discovery procedure S710 is a procedure for discovering a device supportive of Wi-Fi Direct and the exchanging information required for a connection with the discovered device. In this procedure, each of the devices can exchange the informations shown in Tables 1 to 3. According to the present invention, it is able to further perform an operation of determining a group owner in the device discovery procedure S710.

The group formation procedure S720 is a procedure for forming a group of devices, which will be connected to each other, and is the procedure for exchanging informations required for group formation with each other. One of the informations may include a group owner intent value. According to the present invention, in the group formation procedure S720, it is able to further perform an operation of setting a group owner intent value dynamically.

Figure 8:
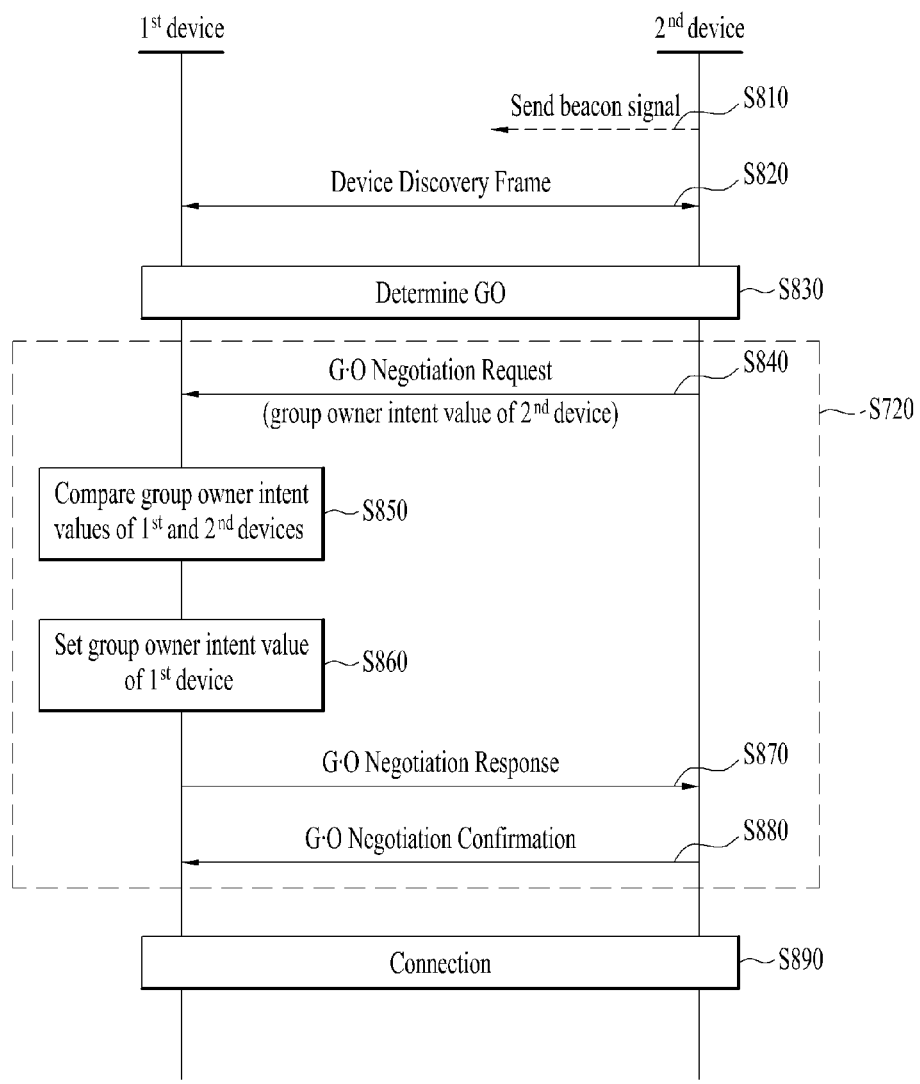
FIG. 8 is a diagram of a communication performing procedure using Wi-Fi Direct according to one embodiment of the present invention.

FIG. 8 is a detailed diagram of the communication performing procedure shown in FIG. 7.

Referring to FIG. 8, the 1st device detects a beacon signal transmitted from the 2nd device [S810] and is then able to perform a device discovery procedure with the 2nd device. In particular, the 1st device exchanges a device discovery frame with the 2nd device, thereby exchanging information required for the connection with each other [S720]. In this case, the device discovery frame may include the informations shown in Tables 1 to 3. And, the 1st device is able to determine a GO (group owner) in the device discovery procedure. The 1st device is able to determine the GO based on a service information included in the device discovery frame. Since the GO determination has been already described in detail with reference to FIG. 4, its redundant details shall be omitted for clarity.

Subsequently, the 1st device can receive a GO negotiation request from the 2nd device [S840]. In this case, the GO negotiation request may further include the service informations shown in Table 2 and Table 3 as well as a group owner intent value. The 1st device compares the group owner intent value of the 1st device to the group owner intent value of the 2nd device and is then able to set the group owner intent value of the 1st device to enable the group owner intent value of the device determined as the group owner in a step S830 to have a greater value [S860].

Subsequently, the 1st device sends a GO negotiation response including the set group owner intent value of the 1st device to the 2nd device [S870] so that the 2nd device can check the group owner intent value of the 1st device. Through the above-mentioned procedure, the 1st device and the 2nd device determine a group owner and a group client. If the 2nd device sends a GO negotiation confirmation to the 1st device, the group formation procedure is ended. Once the group formation procedure is finished, a communication connection can be established between the 1st device and the 2nd device. Of course, after the group formation procedure, such procedures as authentication, association and the like may be further performed, which are not directly related to the present invention. Hence, details of authentication, association and the like shall be omitted.

Accordingly, in case of a connection using Wi-Fi Direct, the above-described wireless communication method according to one embodiment of the present invention can determine a device, which is determined using network information without modification of direct spec, as a group owner.

In particular, a group owner appropriate for a specific network situation is determined and a group owner intent value can be dynamically set to determine a device, which is determined as a group owner, as the group owner, whereby an efficient group management is possible.

According to one embodiment of the present invention, the above-described method (or operation flowchart) can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

The configurations and methods of the above-described embodiments may not limitedly apply to the above-described device for performing communication using Wi-Fi Direct. Instead, the embodiments may be configured in a manner of being combined with each other entirely or in part to enable various modifications.

INDUSTRIAL APPLICABILITY

The present invention is applicable to Wi-Fi Direct communications.

What is claimed is:

1. A method of performing a wireless device-to-device communication via a first device, the method comprising:
   discovering a second device supportive of the wireless device-to-device communication, wherein the first device is a mirroring server and the second device is a mirroring client;
   receiving second network information of the second device, wherein the second network information includes cellular networks the second device is capable of connecting to and whether the second device supports MIMO;
   receiving a group owner intent value of the second device from the second device; and
   determining a group owner based on first network information of the first device and the second network information, including:
   determining whether the first device is capable of connecting to a cellular network,
   determining whether internet access is required by the first and second devices in order to operate;
   if the first device is not capable of connecting to the cellular network, then assigning the second device as the group owner;
   if the first device is capable of connecting to the cellular network and if the second device is capable of connecting to the cellular network, then assigning the second device as the group owner;
   if the first device is capable of connecting to the cellular network and if the second device is not capable of connecting to the cellular network and internet access is required by the second device and the second device does not support MIMO, then assigning the first device as the group owner; and
   if the first device is capable of connecting to the cellular network and if the second device is not capable of connecting to the cellular network and internet access is not required by the first device and internet access is not required by the second device, then assigning the second device as the group owner,
   wherein the assigning one of the first device and the second device as the group owner includes setting one of the first device and second device that is the group owner to have a higher group owner intent value than the other of the first and second device by adjusting the group owner intent value of the first device.

2. The method of claim 1, further comprising sending the set group owner intent value of the first device to the second device.

3. A first device configured to perform wireless device-to-device communication, comprising:
   a receiver configured to:
   discover a second device supportive of the wireless device-to-device communication, wherein the first device is a mirroring server and the second device is a mirroring client;
   receive second network information of the second device, wherein the second network information includes cellular networks the second device is capable of connecting to and whether the second device supports MIMO; and
   receive a group owner intent value of the second device from the second device; and
   a processor configured to:
   determine a group owner based on first network information of the first device and the second network information, including:
   determine whether the first device is capable of connecting to a cellular network;
   determine whether internet access is required by the first and second devices in order to operate;
   if the first device is not capable of connecting to the cellular network, then assign the second device as the group owner;
   if the first device is capable of connecting to the cellular network and if the second device is capable of connecting to the cellular network, then assign the second device as the group owner;
   if the first device is capable of connecting to the cellular network and if the second device is not capable of connecting to the cellular network and internet access is required by the second device and the second device does not support MIMO, then assign the first device as the group owner; and
   if the first device is capable of connecting to the cellular network and if the second device is not capable of connecting to the cellular network and internet access is not required by the first device and internet access is not required by the second device, then assign the second device as the group owner,
   wherein the assigning one of the first device and the second device as the group owner includes setting one of the first device and second device that is the group owner to have a higher group owner intent value than the other of the first and second device by adjusting the group owner intent value of the first device.

4. The first device of claim 3, further comprising a transmitter configured to send the set group owner intent value of the first device to the second device.

5. The method of claim 1, wherein the mirroring server is a mobile terminal and the mirroring client is a vehicle head unit.

6. The first device of claim 3, wherein the mirroring server is a mobile terminal and the mirroring client is a vehicle head unit.

* * * * *